(12) United States Patent
Carpenter et al.

(10) Patent No.: US 7,168,086 B1
(45) Date of Patent: Jan. 23, 2007

(54) PROXY FOR VIDEO ON DEMAND SERVER CONTROL

(75) Inventors: J. Wiltse Carpenter, San Francisco, CA (US); Timo Bruck, Mountain View, CA (US); Lee S. Mighdoll, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/201,484

(22) Filed: Nov. 30, 1998

(51) Int. Cl.
*H04N 7/173* (2006.01)

(52) U.S. Cl. ................................ 725/98; 725/120

(58) Field of Classification Search ............. 725/118, 725/119, 120, 127, 148, 149, 95, 96, 93, 98; 709/246
See application file for complete search history.

(56) References Cited

U.S. PATENT DOCUMENTS

| | | | |
|---|---|---|---|
| 4,305,131 A | 12/1981 | Best | 345/716 |
| 4,766,581 A | 8/1988 | Korn et al. | |
| 4,788,675 A | 11/1988 | Jones et al. | |
| 4,873,584 A | 10/1989 | Hashimoto | |
| 4,947,244 A | 8/1990 | Fenwick et al. | |
| 5,075,771 A | 12/1991 | Hashimoto | |
| 5,319,455 A | 6/1994 | Hoarty et al. | |
| 5,327,544 A * | 7/1994 | Lee et al. | 716/18 |
| 5,412,415 A | 5/1995 | Cook et al. | 725/144 |
| 5,414,455 A | 5/1995 | Hooper et al. | |
| 5,453,779 A | 9/1995 | Dan et al. | |
| 5,461,415 A | 10/1995 | Wolf et al. | |
| 5,491,820 A | 2/1996 | Belove et al. | |
| 5,512,935 A | 4/1996 | Majeti et al. | |
| 5,512,954 A | 4/1996 | Shintani | |
| 5,517,257 A | 5/1996 | Dunn et al. | 348/734 |
| 5,524,272 A | 6/1996 | Podowski et al. | |
| 5,526,035 A | 6/1996 | Lappington et al. | |
| 5,530,961 A | 6/1996 | Janay et al. | |
| 5,534,941 A | 7/1996 | Sie et al. | |
| 5,544,354 A | 8/1996 | May et al. | |
| 5,550,578 A | 8/1996 | Hoarty et al. | |
| 5,553,223 A | 9/1996 | Greenlee et al. | |
| 5,554,980 A | 9/1996 | Hashimoto et al. | |
| 5,555,244 A | 9/1996 | Gupta et al. | |
| 5,557,316 A | 9/1996 | Hoarty et al. | 725/114 |
| 5,585,838 A | 12/1996 | Lawler et al. | |
| 5,589,945 A | 12/1996 | Abecassis | |

(Continued)

FOREIGN PATENT DOCUMENTS

DE 198 11 910 A 9/1998

(Continued)

OTHER PUBLICATIONS

Ubik S., "Possibilities of Using Protocol Converters for NIR System Construction", Computer Communications Review, U.S. Association for Computing Machinery, New York, vol. 27, No. 2, Apr. 1997, pp. 37-48.

(Continued)

*Primary Examiner*—Andrew Y. Koenig
(74) *Attorney, Agent, or Firm*—Klarquist Sparkman, LLP

(57) ABSTRACT

A video on demand system includes a head-end coupled through a proxy server to plural client terminals. The proxy server performs (or cooperates with another component in performing) various functions, including user interface definition, security, system administration (e.g. channel management, load distribution, and failover), and protocol translation.

16 Claims, 4 Drawing Sheets

U.S. PATENT DOCUMENTS

| | | | |
|---|---|---|---|
| 5,592,551 A | 1/1997 | Lett et al. | |
| 5,600,364 A | 2/1997 | Hendricks et al. | |
| 5,600,368 A | 2/1997 | Matthews, III | 348/143 |
| 5,619,247 A | 4/1997 | Russo | |
| 5,619,249 A | 4/1997 | Billock et al. | |
| 5,621,456 A | 4/1997 | Florin et al. | |
| 5,630,204 A | 5/1997 | Hylton et al. | |
| 5,648,824 A | 7/1997 | Dunn et al. | 348/734 |
| 5,652,613 A | 7/1997 | Lazarus et al. | |
| 5,654,748 A | 8/1997 | Matthews, III | 348/13 |
| 5,657,072 A | 8/1997 | Aristides et al. | |
| 5,682,511 A | 10/1997 | Sposato et al. | 345/353 |
| 5,684,799 A | 11/1997 | Bigham et al. | |
| 5,687,331 A | 11/1997 | Volk et al. | 345/327 |
| 5,692,214 A | 11/1997 | Levine | |
| 5,721,829 A | 2/1998 | Dunn et al. | 395/288.49 |
| 5,727,159 A | 3/1998 | Kikinis | |
| 5,729,280 A * | 3/1998 | Inoue et al. | 725/101 |
| 5,734,444 A | 3/1998 | Yoshinobu | |
| 5,748,499 A | 5/1998 | Trueblood | |
| 5,751,282 A | 5/1998 | Girard et al. | 345/327 |
| 5,752,160 A | 5/1998 | Dunn | |
| 5,758,257 A | 5/1998 | Herz et al. | |
| 5,758,258 A | 5/1998 | Shoff | 455/5.1 |
| 5,758,259 A | 5/1998 | Lawler | 455/5.1 |
| 5,768,539 A | 6/1998 | Metz et al. | |
| 5,781,228 A | 7/1998 | Sposato | 348/13 |
| 5,790,115 A | 8/1998 | Pleyer et al. | 345/327 |
| 5,798,785 A | 8/1998 | Hendricks et al. | |
| 5,799,017 A * | 8/1998 | Gupta et al. | 370/419 |
| 5,801,747 A | 9/1998 | Bedard | |
| 5,815,145 A | 9/1998 | Matthews, III | 345/327 |
| 5,816,918 A | 10/1998 | Kelly et al. | |
| 5,818,439 A | 10/1998 | Nagasaka et al. | |
| 5,828,370 A | 10/1998 | Moeller et al. | 234/328 |
| 5,835,087 A | 11/1998 | Herz et al. | |
| 5,850,218 A | 12/1998 | LaJoie et al. | |
| 5,857,190 A | 1/1999 | Brown | 707/10 |
| 5,861,906 A | 1/1999 | Dunn et al. | |
| 5,874,985 A | 2/1999 | Matthews, III | 348/7 |
| 5,883,661 A * | 3/1999 | Hoarty | 725/93 |
| 5,886,690 A | 3/1999 | Pond et al. | |
| 5,898,387 A * | 4/1999 | Davis et al. | 340/870.02 |
| 5,907,715 A | 5/1999 | Stoel et al. | |
| 5,935,004 A | 8/1999 | Tarr et al. | |
| 5,959,621 A | 9/1999 | Nawaz et al. | |
| 5,959,697 A | 9/1999 | Coleman, Jr. | 348/700 |
| 5,971,849 A | 10/1999 | Falciglia | 463/16 |
| 6,002,394 A | 12/1999 | Schein et al. | |
| 6,020,912 A | 2/2000 | DeLang | 348/7 |
| 6,023,731 A * | 2/2000 | Chawla | 709/231 |
| 6,025,837 A | 2/2000 | Matthews, III et al. | |
| 6,065,042 A | 5/2000 | Reimer et al. | |
| 6,075,526 A | 6/2000 | Rothmuller | |
| 6,078,348 A | 6/2000 | Klosterman et al. | |
| 6,097,441 A | 8/2000 | Allport | |
| 6,104,390 A | 8/2000 | Sturgeon et al. | |
| 6,118,450 A | 9/2000 | Proehl et al. | |
| 6,130,726 A | 10/2000 | Darbee et al. | |
| 6,137,539 A | 10/2000 | Lownes et al. | |
| 6,141,003 A | 10/2000 | Chor et al. | |
| 6,151,059 A | 11/2000 | Schein et al. | |
| 6,154,771 A | 11/2000 | Rangan et al. | |
| 6,177,931 B1 | 1/2001 | Alexander et al. | |
| 6,184,877 B1 | 2/2001 | Dodson et al. | |
| 6,195,692 B1 | 2/2001 | Hsu | |
| 6,201,538 B1 | 3/2001 | Wugofski | |
| 6,233,736 B1 | 5/2001 | Wolzien | 725/110 |
| 6,312,336 B1 | 11/2001 | Handelman et al. | |
| 6,323,911 B1 | 11/2001 | Schein et al. | |
| 6,349,410 B1 | 2/2002 | Lortz | |
| 6,363,440 B1 | 3/2002 | Stepp et al. | |
| 6,378,130 B1 * | 4/2002 | Adams | 725/95 |
| 6,388,714 B1 | 5/2002 | Schein et al. | |
| 6,392,664 B1 | 5/2002 | White et al. | |
| 6,412,110 B1 | 6/2002 | Schein et al. | |
| 6,571,390 B1 | 5/2003 | Dunn et al. | |
| 6,614,987 B1 | 9/2003 | Ismail et al. | |
| 6,628,302 B1 | 9/2003 | White et al. | |
| 6,637,029 B1 | 10/2003 | Maissel et al. | |
| 6,654,721 B1 | 11/2003 | Handelman | |
| 6,704,028 B1 | 3/2004 | Wugofski | |
| 6,732,366 B1 | 5/2004 | Russo | |
| 6,732,369 B1 | 5/2004 | Schein et al. | |
| 6,756,997 B1 | 6/2004 | Ward, III et al. | |
| 6,757,691 B1 | 6/2004 | Welsh et al. | |
| 6,784,879 B1 | 8/2004 | Orr | |
| 6,973,669 B1 | 12/2005 | Daniels | |
| 2002/0032907 A1 | 3/2002 | Daniels | |
| 2002/0100044 A1 | 7/2002 | Daniels | |
| 2003/0056216 A1 | 3/2003 | Wugofski et al. | |
| 2004/0261125 A1 | 12/2004 | Ellis et al. | |

FOREIGN PATENT DOCUMENTS

| | | |
|---|---|---|
| EP | 0 140 593 A2 | 5/1985 |
| EP | 0 277 015 A2 | 8/1988 |
| EP | 0 477 124 A | 3/1992 |
| EP | 0 646 857 A | 4/1995 |
| EP | 0 720 368 A | 7/1996 |
| EP | 0 782 337 A2 | 7/1997 |
| EP | 0 788 289 A2 | 8/1997 |
| EP | 0 798 899 A1 | 10/1997 |
| EP | 0 811 939 A | 12/1997 |
| EP | 0 845 906 A | 3/1998 |
| EP | 0 852 443 A2 | 7/1998 |
| EP | 0 123 456 A2 | 1/2000 |
| JP | 0721 283 A | 7/1996 |
| WO | WO 92/10040 | 6/1992 |
| WO | WO 95/15658 | 6/1995 |
| WO | WO 96/17306 | 6/1996 |
| WO | WO 96/17467 | 6/1996 |
| WO | WO 97/03521 | 1/1997 |
| WO | WO 97/24832 | 7/1997 |
| WO | WO 98/00951 A | 1/1998 |
| WO | WO 98 43419 A | 10/1998 |
| WO | WO 98/44424 | 10/1998 |

OTHER PUBLICATIONS

Namihira D. et al., "A Media Proxy Architecture for an NFS-Based VOD Service on the Intranet", IEEE Pacific Rim Conference on Communications, Computers and Signal Processing, U.S., New York, N.Y.: IEEE, vol. Conf. 6, 1997, pp. 97-100.

Gottfried W.R. Luderer et al., "Distributed Multimedia using Corba", Global Telecommunications Conference (Globecom), U.S., New York, IEEE, 1996, pp. 68-72.

Amazon.com, Mar. 13, 1999, 3 pages.

Ubik, S., "Possibilities of Using Protocol Converters for NIR System Construction" Computer Communications Review, U.S. Association for Computing Machinery, New York.

Namihira et al., "A Media Proxy Architecture for an NFS-Based VOD Service on the Intranet", IEEE Pacific Rim Conference on Communications, Computers and Signal Processing, U.S., New York.

Gottfried W.R., Luderer et al., "Distributed Multimedia using Corba", Global Telecommunications Conference (Globecom), U.S., New York, IEEE, 1996, pp. 68-72.

Bellovin, S. et al., "Network Firewalls." *IEEE Communications Magazine*, vol. 32, No. 9, Sep. 1994, pp. 50-57.

Dan, A. et al., "Channel Allocation under Batching and VCR Control in Video-On-Demand Systems." *Journal of Parallel and Distributed Computing*, vol. 30, No. 2, Nov. 1, 1995, pp. 168-179.

De Jong, A. et al., "A VoD Application Implementation in Java." *Multimedia Tools and Applications*, vol. 5, 1997, pp. 161-170.

Kerr, G., "A Review of Fully Interactive Video on Demand." *Signal Processing Image Communication,* vol. 8, No. 3, Apr. 1996, pp. 173-190.

Brooks et al., "Application-Specific Proxy Servers as HTTP Stream Transducers", Internet Citation, XX, XX, Dec. 1, 1995, pp. 1-9, XP002081461.

Fox et al., "Reducing WWW latency and bandwidth requirements by real-time distillation", Computer Networks and ISDN Systems, North Holland Publishing, Amsterdam, NL, vol. 28, No. 11, May 1996, pp. 1445-1456, XP004018241.

* cited by examiner

PROXY FOR VIDEO ON DEMAND SERVER CONTROL

RELATED APPLICATION DATA

The subject matter of this application is generally related to that disclosed in the following applications filed contemporaneously herewith:

Video on Demand Methods and Systems (White et al);

Method and System for Presenting Television Programming and Interactive Entertainment (White et al); and Interactive Video Programming Methods (White et al).

The subject matter of this application is also generally related to the subject matter of application Ser. No. 09/153,577, filed Sep. 15, 1998.

The disclosures of these related applications are incorporated by reference.

FIELD OF THE INVENTION

The present invention relates generally to interactive entertainment systems, and more particularly relates to the use of a processor between the head-end and the clients, to which various processing tasks can advantageously be delegated.

BACKGROUND AND SUMMARY OF THE INVENTION

The popularity of the Internet, a well-known, global network of cooperative interconnected computer networks, combined with the widespread availability of low-cost broadband networking and advanced digital compression techniques, has spurred the growth of what is known as interactive television. Interactive television provides viewers with compelling Internet and video content on their home television equipped only with a simple internet-television terminal, such as those pioneered by WebTV Networks, Inc. WebTV terminals are akin to the set-top boxes associated with a cable television network, and work in conjunction with a standard home television set to display both Internet and traditional television content, so that persons without access to a personal computer are able to access the Internet.

The ability to combine video content with the interactive features of interactive television has spawned numerous providers of video-on-demand applications for interactive entertainment systems. Currently, the typical video-on-demand application for interactive television consists of plural video-on-demand clients on terminals attached to the viewer's home television, and one or more video-on-demand servers connected to the video head-end. The user interface of current video-on-demand applications is contained entirely in the video-on-demand client, and provides commands to the video-on-demand server to select, start or stop and pay for the video played on the viewer's home television. Typically, the video-on-demand server provides access to the video content available for transmission, whereas the client controls the selection of the video and the payment mechanism.

There are several different brands of video-on-demand applications available on the market today. Three examples are Seachange, Vivid and Microsoft's Netshow Theater. In view of the popularity of the video-on-demand feature of interactive television, there will likely be many more video-on-demand servers developed in the near future.

One of the difficulties with the proliferation of competing video-on-demand applications is the lack of an industry standard communications protocol. The protocol controls the communication between the video-on-demand server and the various video-on-demand clients on the interactive television network. The challenge in a video-on-demand application is that it must be capable of managing not only the download of digital video data to the client, but also the transmission of control data to and from the client relating to system administration (e.g. channel assignment data, billing information, etc.).

Currently, most video-on-demand servers use a proprietary communications protocol unique to that video-on-demand server. Problems arise when the protocols used to control the video-on-demand servers aren't understood (are incompatible with) the protocols supported by the various video-on-demand clients. Examples of some of the diverse protocols in use today are DAVEC (a cable modem standard), DSMTC (used by certain video head-ends), and RTSP (an industry-proposed standard that has met with little success). The use of incompatible protocols has limited expansion options available to existing video on demand systems.

Moreover, the current configuration of most interactive video systems provide incomplete failover recoverability since the back-end servers on which most video-on-demand servers reside necessarily cannot completely manage their own failure.

Current video-on-demand servers use a limiting "segmented channel" model to transmit the video data. Under this model, each viewer is assigned a dedicated video channel. This greatly limits flexibility and expansion options.

Various embodiments of the present invention redress these and other shortcomings of the prior art by interposing a middle tier in the interactive video system. This middle tier—commonly a proxy server—provides various services, including protocol translation, system administration (dynamic channel assignment, load distribution, and failover), dynamic error-patching, and security.

According to one aspect, the invention provides an improved system and method for delivering a video-on-demand feature to remote clients of an interactive television network. The system and method employ the proxy server to reconfigure the components of a video-on-demand application into a flexible multi-tiered configuration, and to redistribute the functions of those components to the proxy server so as to enhance the performance, reliability, security, scalability and other features of the system.

One implementation of the present invention includes one or more proxy servers interposed between one or more video-on-demand servers and one or more video-on-demand clients. The proxy server includes a protocol translation component, a user interface component, a channel management component, a loadsharing component, a failover component and a security component.

The translation component translates, if necessary, the communication protocols used by the video-on-demand server and video-on-demand client, and fixes—on-the-fly—certain errors in those protocols. The user interface component distributes the user interface between the video-on-demand server and video-on-demand client and provides user interface enhancements. The channel management component manages the assignment of transmission channels to video-on-demand clients. The failover component redirects requests to failed video-on-demand servers to secondary/alternate servers. The loadsharing component manages the load between the video-on-demand servers and possibly one or more other proxy servers in a given server configuration of the interactive television network at the head-end. The security component provides a uniform security framework that previously was located in each individual video-on-demand server at the head-end.

In one implementation of the method and system, a promotional component is also provided to initiate delivery of customized promotional content from the proxy server to the video-on-demand client.

The foregoing and other features and advantages of the present invention will be more readily apparent from the following detailed description, which proceeds with reference to the accompanying drawings.

DETAILED DESCRIPTION

Figure 1:
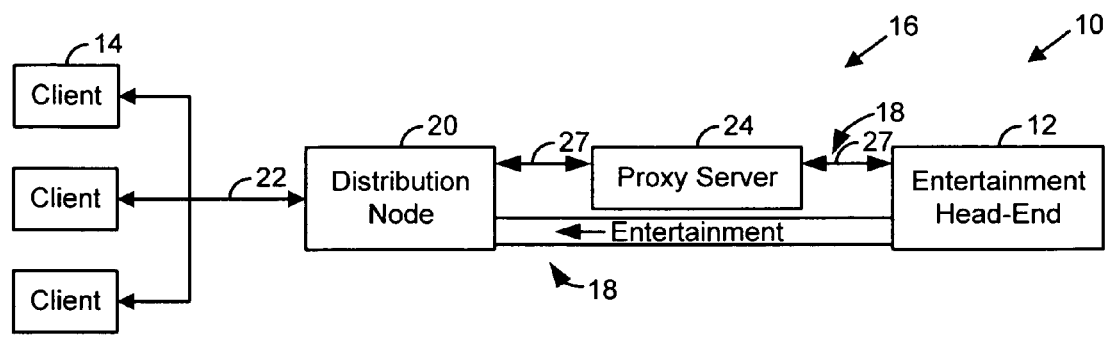
FIG. 1 is a block diagram of an interactive video system that can be used in accordance with the present invention.

Referring to FIG. 1, an exemplary interactive entertainment system 10 according to one embodiment of the present invention includes an entertainment head-end 12, one or more proxy servers 24, and one or more client terminals 14 intercoupled through a network 16. The proxy servers 24 are computers interposed in a middle tier between the head-end 12 and the client terminals 14 to perform various interactive video system control and user interface (UI) functions.

The network 16 typically comprises coaxial cable or optical fiber 18, extending from the head-end 12 to distribution nodes 20 within various neighborhoods. From the distribution nodes, further cables 22 couple to individual subscriber premises.

The proxy server 24 is interposed in a logical TCP/IP control channel 27 between the head-end and clients. While the control signals and the entertainment are physically conveyed on the same cable 18, they are shown separately in FIG. 1 for conceptual clarity.

Figure 2:
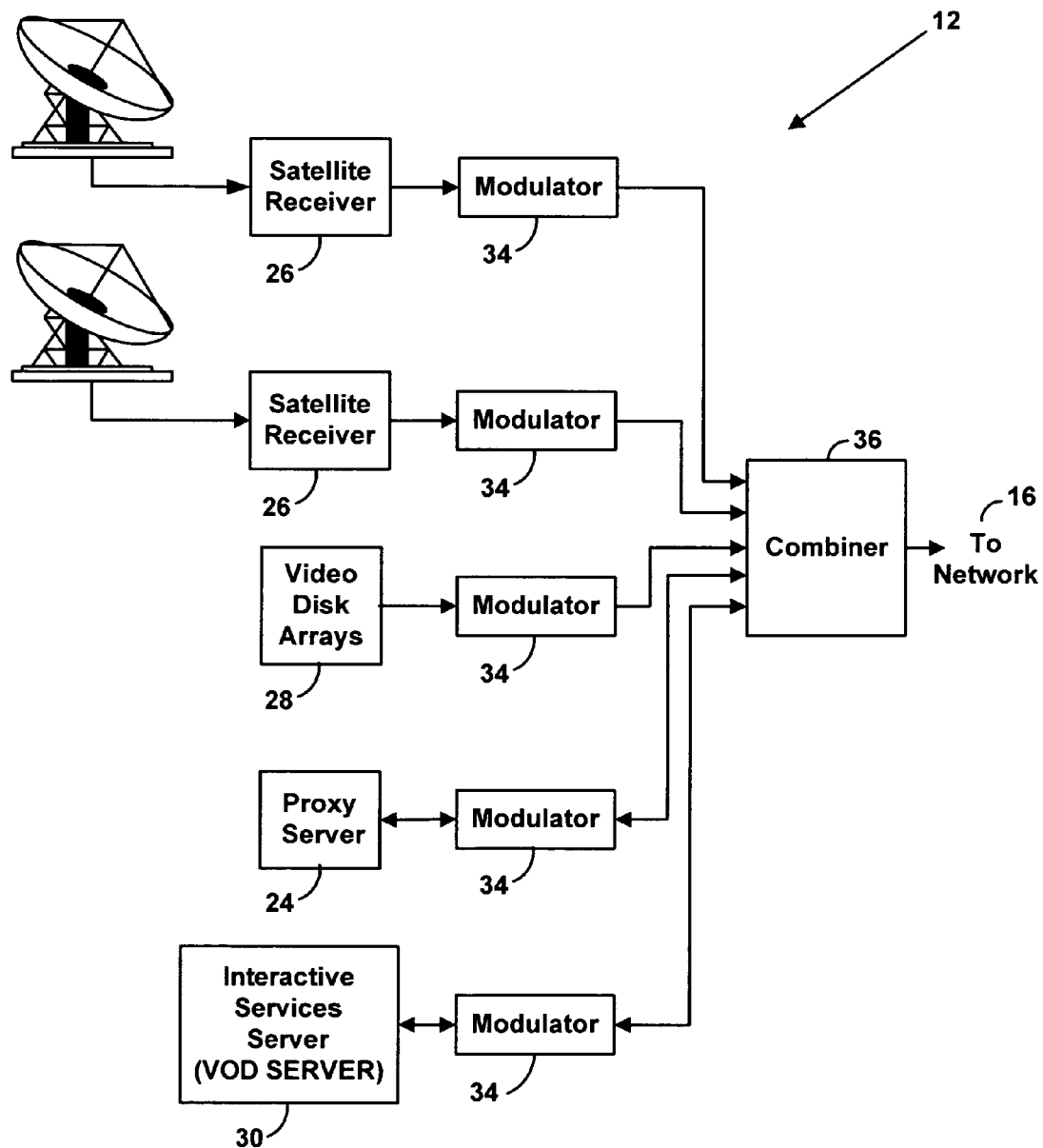
FIG. 2 is a block diagram of the entertainment video head-end of FIG. 1.

As shown in FIG. 2, the entertainment head-end 12 includes the components typically associated with a cable television head-end installation, e.g. satellite receivers 26 for receiving satellite broadcasts and producing corresponding baseband analog video signals. Additionally, head-end 12 includes fast digital disk arrays and/or optical storage 28 for storage of MPEG-encoded digital video for on-demand delivery. Head-end 12 also includes one or more interactive services servers 30, which output HTML-based programming (e.g. customized news, celebrity chat, interactive jukebox, and interactive games), as further detailed in the related applications by White et al.

The illustrated head-end 12 is shown as including the proxy servers 24. In some implementations, such servers are co-located at the head-end; in others, the proxy servers are remote from the head-end.

The transmission of the various forms of data from head-end 12 over the network 16 is straightforward. As is familiar to those skilled in the video arts, the analog video is commonly distributed on 6 MHz channels, beginning at 52 MHz and extending upwardly. The digital video can be encoded on a carrier for transmission within one of these conventional broadcast channels, or can be modulated at one or more other unused frequencies. Statistical multiplexing is desirably employed to transmit plural channels of digitized video with reduced bandwidth. The HTML-based interactive services and the control data can be transmitted using a conventional protocol (e.g. TCP/IP) and modulated onto a suitable carrier frequency for distribution over the network. After modulation to appropriate distribution frequencies by modulators 34, these various signals are combined by an RF combiner 36 for distribution over the network 16.

Figure 3:
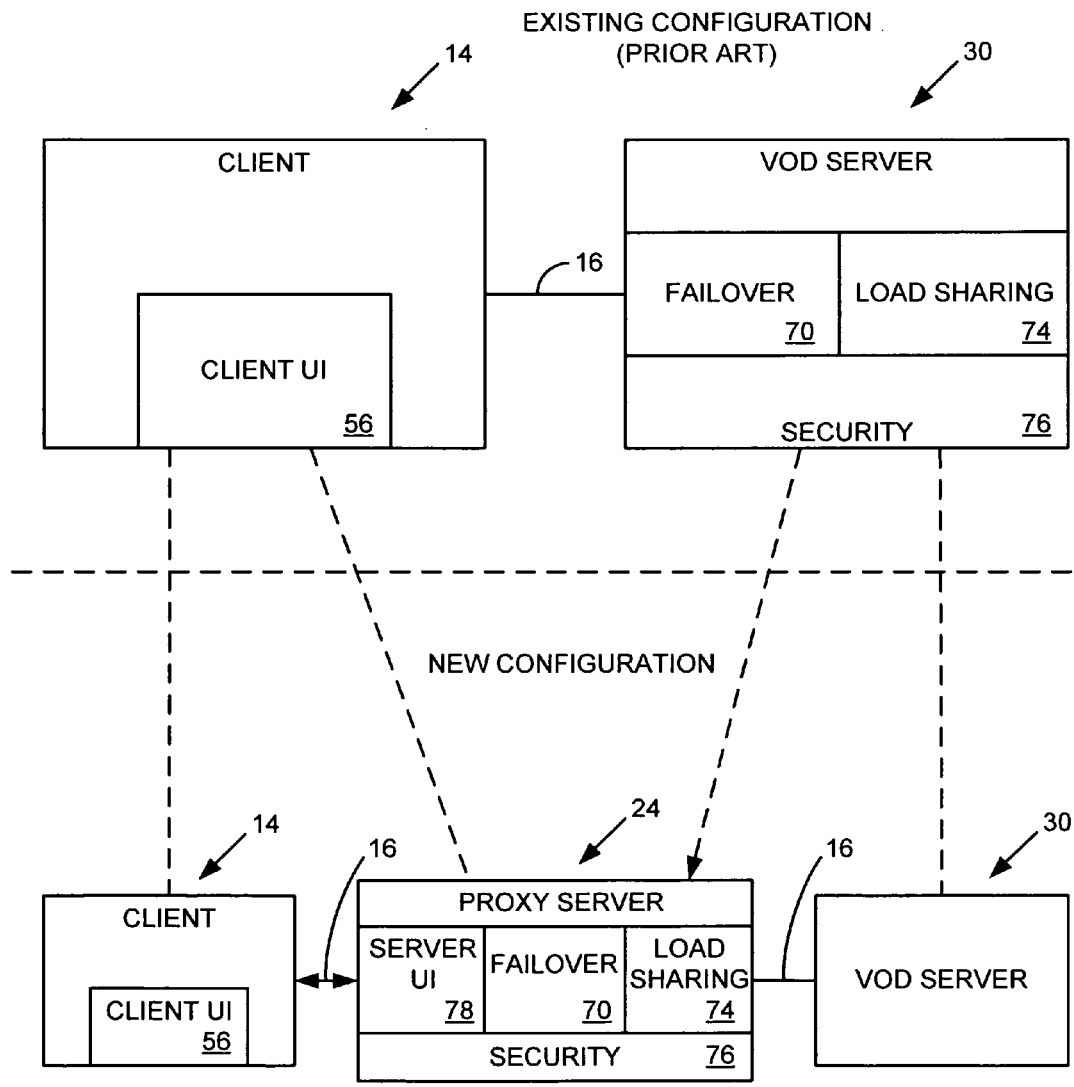
FIG. 3 is a block diagram of video-on-demand components.

Referring to the top portion of FIG. 3, a typical prior art video-on-demand system includes a client terminal 14 intercoupled to a video-on-demand server 30 in head-end 12 through a network 16. The client terminal 14 includes a client user interface (UI) 56 to perform various interactive video system control functions, such as video selection, start, stop and payment. The video-on-demand back-end server 30 is a computer, usually co-located with the interactive services server 30, and may include a failover component 70, a loadsharing component 74 and a security component 76 to perform various interactive video system control functions such as receiving and transmitting control data relating to system administration (e.g. channel assignment data, billing information, etc.), error recovery and load management.

Referring to the bottom portion of FIG. 3, the illustrated implementation of the present invention interposes a proxy server 24 between the client terminal 14 and the video-on-demand server 30. In the new configuration the UI function is now shared between the client UI 56 on the client terminal 14 and the server UI 78 on the proxy server 24. The video-on-demand back-end server 30 no longer contains the failover component 70, loadsharing component 74 or security component 76. Those functions have been distributed instead to the proxy server 24.

Figure 4:
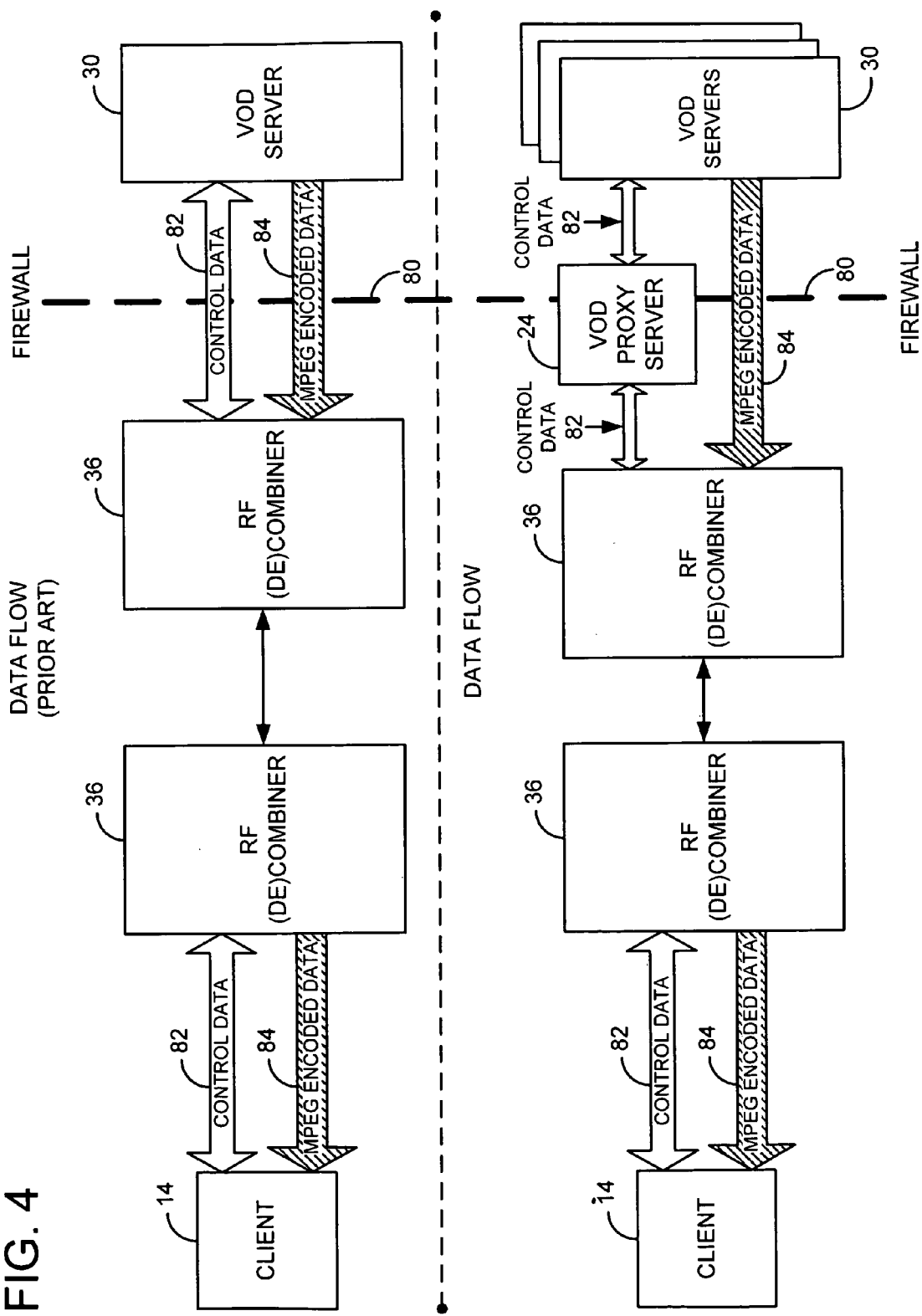
FIG. 4 is a block diagram of a configuration of a video-on-demand application.

The top portion of FIG. 4 shows another representation of a prior art video-on-demand system, and the lower portion shows an embodiment of the present invention. As is familiar to those skilled in the relevant arts, a security firewall 80 is commonly provided to limit access to the video-on-demand back-end servers 30 (the bi-directional control data 82 is typically transmitted over an unsecured IP link).

Focusing on the bottom portion of FIG. 4, the illustrated embodiment interposes the proxy server 24 between the client 14 and the video-on-demand back-end server 30. The introduction of the proxy server 24 greatly enhances the configurability of the interactive video system. The back-end servers still transmit the MPEG encoded video data 84 directly to the RF combiners 36. But by separately managing the control data 82 flowing between the clients 14 and multiple back end servers 30, the proxy server 24 serves as an additional security layer—insulating the back end video-on-demand servers 30 from the IP link over which the control data 82 is transmitted. Configured in this way, the back-end video-on-demand servers 30 may be used more as a commodity available to one or more proxy servers 24 in the transmission of MPEG encoded video data 84 from the back-end server 30 to the client terminal 14.

Moreover, the proxy server 24 can perform various administrative management functions, such as managing channel assignments for video-on-demand transmission.

Here a distinction should be drawn between two types of "channels." The first, termed a "transmission channel," refers to an actual frequency channel (e.g. 52–58 MHz) that is used to relay programming from the head-end 12 to the client terminal 14 over the network 16. The second, termed a "viewer channel," refers to the moniker (e.g. MSNBC, CNN, GAME, CHAT, VIDEO) by which a user distinguishes different programming. The mapping between viewer and transmission channels is determined by the system, e.g. proxy server 24.

The VIDEO channel is a viewer channel—it is the channel to which the viewer switches to receive video-on-demand programming. The frequency over which this programming is delivered is not important to the viewer. Different transmission channels may be available for use at different times, depending system resource usage (e.g. other viewers' video-on-demand usage). One day the 108–114 MHz transmission channel might be used to relay on-demand video to a subscriber. The next day, the 114–120 MHz transmission channel might be used instead. Data indicating the assignment of transmission channels-to-viewer channels is periodically sent as control data 82 between the proxy server 24 and the client terminal 14.

If a viewer interrupts delivery of an on-demand video, e.g. by switching to another channel or pressing STOP on a control panel (as further detailed in the related application by White et al), transmission of the video is suspended. The proxy maintains the assignment of the original transmission channel to that client briefly, but if the video is not promptly resumed, that transmission channel is returned by the proxy server 24 to a pool of available transmission channels. If the viewer thereafter returns to the VIDEO channel (or presses PLAY on a control panel), this fact is communicated to the proxy server 24 by the client terminal over the control data link. The proxy server 24 then identifies an available transmission channel and instructs the client terminal 14 to tune to that channel. (This retuning is transparent to the viewer, whose channel selection remains at the VIDEO viewer channel.) The proxy server 24 similarly instructs the video server 30 to resume transmission of the requested video from the point of interruption, or just before the point of interruption (for purposes of viewing context), this time modulating it on the newly-assigned channel. Video delivery resumes. However, unknown to the viewer, the video delivery resumes on a transmission frequency different than that originally used.

In addition to managing system resources such as transmission channels, the proxy server 24 also serves as a convenient control point for administering certain UI functions on the client terminals 14. Thus, for example, a video-selection UI by which a viewer selects a desired video from a library of available videos can be defined at the proxy server 24 (which is in constant communication with the back end server's video library data), and distributed to the clients 14 as needed. (These UI elements at the proxy server include HTML instructions that are sent to the client for rendering to produce the desired user interface screens and controls.)

Similarly, by controlling from the proxy server certain client UI elements (e.g. buttons, controls, graphics, labels, and other screen customizations presented to the viewer on the client terminal), it is possible to update the UI elements with new features, or to apply changes to reflect new promotional features or different branding, as needed. For example, the logo of a particular video-on-demand server may appear on a button on a UI screen presented to a viewer. The server UI 78 of the proxy server 24 can dynamically change that logo as it appears on the various client terminals 14 to reflect the branding of the various video-on-demand back-end servers 30 it controls.

In contrast, primitives defining other UIs are maintained at the client terminal 14. An example is a video playback UI, with PLAY, STOP, REWIND, etc., buttons. This UI is well defined and static, so there is less advantage to distributing its definition out to the proxy server.

A viewer operating the client terminal 14 is unaware of the origin of the UIs presented on the viewing screen. The viewer may invoke a video playback UI (originating at the client terminal) to stop playback of an on-demand video. After pressing STOP, the system may immediately present a further UI (originating at the proxy server) indicating that the viewer has electronic mail waiting, or indicating the time-remaining in the interrupted video.

Another function of the illustrated proxy server 24 is to effect protocol translation between the protocol employed by the client, and that employed by the server. As noted, there are a wide variety of such protocols. While new video-on-demand systems are commonly installed with a consistent client/server protocol, subsequent events can lead to changes. For example, by acquisition or otherwise, an operator of a video-on-demand system may inherit client terminals from another (non-compatible) system. The provision of protocol translation in the proxy server facilitates integration of such non-compatible client terminals into the system. Similarly, upgrades to a video-on-demand system may entail substitution of a video server employing a different control protocol. Again, protocol translation by the proxy server facilitates integration of such new equipment.

Still another function of illustrated proxy server 24 is loadsharing and failover administration. In the loadsharing component 74, the proxy server 24 monitors the loads on the various video-on-demand back-end servers 30 under its control, and allocates the video-on-demand viewing load accordingly. (In an exemplary embodiment, the head-end includes several video servers. Currently popular movie titles may be replicated in several of the servers to accommodate their expected high demand. Older, classic films, in contrast, may be present on just one server.)

Loadsharing 74 works in conjunction with the failover 70 function, where the proxy server 24 redirects requests to failed back-end servers 30 to other available servers. In this way, the proxy server 24 enhances performance by managing what would likely be a catastrophic failure in the prior art configuration of video entertainment systems 10.

Yet another function of the illustrated proxy server 24 is to fix—on-the-fly—certain problems associated with either a client or a server. For example, a certain client may, in a particular circumstance, erroneously send two PLAY commands when only one should be sent. The proxy server can be programmed to look for such aberrant behavior, and pass on to the video server only a single PLAY command. Similarly, a video server may have a bug in a JPEG compression routine that causes certain image data transmitted from the server to be flawed, prompting a receiving client to fail. The proxy server can monitor the traffic from the server for such corrupted JPEG data, and can correct it before passing same to the client. (It will be recognized that this general capability is widely applicable, and is not limited to the particular bug-fixes given in these examples.)

Figure 5:
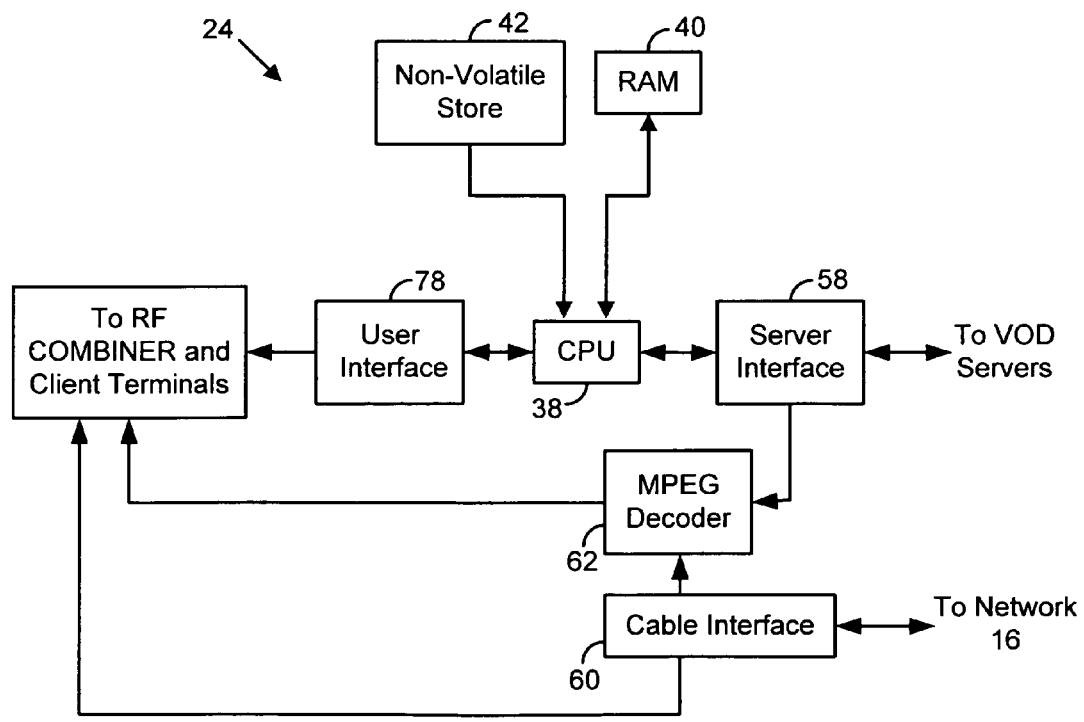
FIG. 5 is a block diagram of a proxy server of FIG. 1.

FIG. 5 is a block diagram of an exemplary proxy server 24. The illustrated server includes a CPU 38, RAM memory 40, non-volatile memory 42, a user interface (UI) 78, and appropriate interfaces to the RF combiners 36 and back-end video-on-demand servers 30.

The CPU 38 can be any of several microprocessors, e.g. those available from Intel, AMD, Cyrix, Motorola, etc. Alternatively, the CPU 38 can be a custom device that optionally integrates one or more of the other components of proxy server 24.

The RAM memory 40 typically comprises 256K of EDO memory, but more or less memory, and/or memory of differing type, can alternatively be used.

The non-volatile memory 42 in the illustrated embodiment includes a ROM, EEPROM, or flash memory in which certain components of the server's operating system and applications software are stored. Additionally, the illustrated non-volatile memory 42 includes 4 GB of magnetic disk storage. Software stored in this non-volatile memory (commonly transferred to the RAM memory for execution) causes the proxy server 24 to perform the various functions detailed earlier. (Such programming is well within the capabilities of artisans in this field, so is not belabored.)

Having described and illustrated the principles of our invention with reference to a preferred embodiment and various alternatives, it should be apparent that the invention is not limited to the detailed arrangements.

For example, while the detailed proxy server 24 performed a certain set of functions, in other embodiments such a server can perform a subset (or superset) of these functions.

While the disclosure particularly detailed the proxy server's 24 role in defining aspects of a visual UI presented on the client terminal 14, in other embodiments, the proxy can play a similar role with UIs of other types (e.g. gesture-interfaces, audio interfaces, tactile interfaces, etc.).

Reference was made to HTML. This term is meant to include not just Hypertext Markup Language per se, but also to encompass other graphical and/or video representation systems by which primitives can be combined to yield desired static or moving displays.

The illustrated embodiment employed a wired link to the interactive network, but other distribution arrangements (e.g. direct satellite broadcast, with telephone return channel) can likewise by used. Similarly, the dial-up link is not exclusive; other arrangements (e.g. MetroCOM, etc.) can be used, depending on the needs of the particular application.

Moreover, even a "wired" link to the interactive network needn't be of the sort particularly illustrated. With enhanced compression techniques and delivery technologies, other arrangements—including plain old telephone service—can alternatively be employed.

To provide a comprehensive disclosure without unduly lengthening this specification, applicants incorporate by reference the disclosure of U.S. Pat. No. 5,648,824, which discloses additional details related to video-on-demand systems and related user interfaces.

While the foregoing discussion has detailed a complete system, it employs many inventive concepts—each of which is believed patentable apart from the system as a whole.

In view of the many different embodiments to which the above-described inventive concepts may be applied, it should be recognized that the detailed embodiments are illustrative only and should not be taken as limiting the scope of our invention. Rather, we claim as our invention all such modifications as come within the scope and spirit of the following claims, and equivalents thereto.

We claim:

1. A video system comprising at least two different and non-compatible video-on-demand applications, a video-on-demand server and a remote client, a first video-on-demand application executing on the server, the first video-on-demand application employing a first video-on-demand application control protocol comprising control data communicated to control a video-on-demand application, the client employing a second video-on-demand application control protocol comprising control data communicated to control a video-on-demand application, wherein the first video-on-demand application control protocol employed by the first video-on-demand application at the server is different and non-compatible with the second video-on-demand application control protocol employed by the client, the system further including a proxy comprising a computer interposed between the server and the client in a multi-tier configuration, the proxy including means for translating between the different and non-compatible first and second video-on-demand application control protocols, wherein translating comprises translating control data compatible with the first video-on-demand application but not compatible with the second video-on-demand application into control data compatible with the second video-on-demand application but not compatible with the first video-on-demand application, wherein the server and client can communicate control data through the proxy even if the control data in the first and second protocols are different, and wherein change to either the first or second video-on-demand application control protocol can be accommodated by a change to the proxy rather than to the client or server, respectively and wherein the control data communicated according to the first and second video-on-demand protocols is delivered via data packets transmitted according to a same TCP/IP network protocol.

2. The system of claim 1 wherein the proxy further includes means for translating between at least one of said first and second video-on-demand application control protocols and a third video-on-demand application control protocol comprising control data communicated to control a video-on-demand application and different from said first and second video-on-demand application control protocols, wherein the same proxy can be used in different server/client environments.

3. The system of claim 1 wherein the proxy includes means for ameliorating aberrant behavior in at least one of said server or client.

4. The system of claim 3 wherein the proxy includes means for detecting a predetermined input communication in an input video-on-demand application control protocol, and issuing an output communication in an output video-on-demand application control protocol that does not exactly correspond to the input communication.

5. In a video-on-demand system including at least two non-compatible video-on-demand applications, plural clients receiving on-demand video originating from at least one video server communicating according to a first video-on-demand application and wherein at least one of said plural clients communicates according to a second video-on demand application incompatible with the first video-on-demand application, a proxy server performing a method comprising:

assigning a first transmission channel to a first client to transmit an on-demand video thereto;

assigning a second transmission channel to a second client to transmit an on-demand video thereto;

using control data of the first video-on-demand application, instructing the video server to transmit to the first client on the first transmission channel and instructing the video server to transmit to the second client on the second transmission channel; and using control data of the second video-on-demand application, instructing the first client to receive on the first transmission channel and instructing the second client to receive on the second transmission channel;

wherein the proxy server comprises a computer interposed between the video server and said plural clients in a multi-tier configuration, and the proxy server translates control data compatible with the first video-on-demand application but not compatible with the second video-on-demand application into control data compatible with the second video-on-demand application but not compatible with the first video-on-demand application thereby facilitating integration of non-compatible components into an existing system by providing translation between components communicating according to two or more non-compatible video-on-demand applications.

6. The method of claim 5, wherein the proxy server reassigns the first client to a third transmission channel at a point between the beginning and end of the first client's on-demand video, so as to manage channel resources.

7. In a video-on-demand system comprising two or more non-compatible video-on-demand applications, plural video-on-demand clients requesting video programs according to a first video server control protocol of a first video-on-demand application, and a head-end serving video programs according to a second video server control protocol of a second video-on-demand application, a proxy server performing a method comprising:
from a client, receiving by the proxy server, control data representing a video server control action in the first protocol of the first video-on-demand application;
translating by the proxy server the received control data into control data representing a video control action in the second control protocol of the second video-demand application; and
sending by the proxy server the translated control data to the head-end serving video programs according to the second video server control protocol of the second video-on-demand application;
wherein the proxy server comprises a computer interposed between the head end and the plural video-on-demand clients in a multi-tier configuration and includes a protocol translation component that translates control data compatible with the first video-on-demand application but not compatible with the second video-on-demand application into control data compatible with the second video-on-demand application but not compatible with the first video-on-demand application thereby facilitating integration of non-compatible video-on-demand applications into an existing system by providing translation between components communicating according to two or more non-compatible video-on-demand applications.

8. The system of claim 7, further comprising plural video-on-demand clients requesting video programs according to the second video server control protocol of the second video-on-demand application and the method further comprises:
from a second client, receiving by the proxy server, control data representing a video server control action in the second protocol of the second video-on-demand application; and
sending by the proxy server to the head-end, the control data received from the second client without translation;
wherein the proxy server communicates with the client in the first protocol of the first video-on-demand application, and the proxy server communicates with the second client in the second protocol of the second video-on-demand application.

9. The system of claim 7, further comprising a second video server at the head-end, wherein the second video server serves video programs according to the first video server control protocol of the first video-on-demand application, and the method further comprises:
from a second client, receiving by the proxy server, control data representing a video server control action in the first protocol of the first video-on-demand application; and
sending by the proxy server to the second video server without translation, the control data received from the second client.

10. A computer-readable medium comprising computer-executable instructions for performing a method comprising:
receiving according to a first network control protocol, control data from a client requesting video programs according to a first video-on-demand server control protocol of a first video-on-demand application;
translating the received control data into control data representing a video control action in a second video-on-demand server control protocol of a second video-on-demand application; and
sending, according to the first network control protocol, the translated control data to a head-end serving video-on-demand programs according to the second video-on-demand server control protocol of the second video-on-demand application;
wherein the method is performed by a proxy server comprising a computer interposed between the client and the head-end wherein the proxy server translates to and from control data of the first video-on-demand application and control data of the second video-on-demand application thereby facilitating video-on-demand control between two or more components communicating according to two or more non-compatible video-on-demand applications.

11. The computer readable medium of claim 10, wherein the method further comprises:
receiving control data from a second client requesting video programs according to the second video-on-demand server control protocol of the second video-on-demand application; and
sending without translation, the control data from the second client to the head-end serving video-on-demand programs according to the second video-on-demand server control protocol.

12. The computer readable medium of claim 10, wherein the method further comprises:
receiving control data from a second client requesting video programs according to the first video-on-demand server control protocol of the first video-on-demand application; and
sending without translation, the control data to a second video server at the head-end, wherein the second video server serves video-on-demand programs according to the first video-on-demand server control protocol of the first video-on-demand application.

13. A computer-readable medium comprising instructions for performing a method of translating control data for incompatible video-on-demand applications, the method comprising:
receiving from a first client communicating application control data according to a first video-on-demand application, application control data comprising on-demand video control;
assigning a first transmission channel to the first client;
sending to a head-end communicating application control data according to a second video-on-demand application, application control data comprising instructions to transmit on-demand video on the first transmission channel;

sending to the first client communicating application control data according to the first video-on-demand application, application control data comprising instructions to receive on-demand video on the first transmission channel;

receiving from a second client communicating application control data according to the first video-on-demand application, application control data comprising on-demand video control;

assigning a second transmission channel to the second client;

sending to the head-end communicating application control data according to the second video-on-demand application, application control data comprising instructions to transmit on-demand video on the second transmission channel; and sending to the second client communicating application control data according to the first video-on-demand application, application control data comprising instructions to receive on-demand video on the second transmission channel:

wherein the method is performed by a proxy server comprising a computer interposed between the first and second clients and the head-end and wherein the proxy server translates between control data compatible with the first video-on-demand application but not compatible with the second video-on-demand application and control data compatible with the second video-on-demand application but not the first video-on-demand application and the sent and received application control data comprising the first and second video-on-demand application is transmitted according to a same network communication protocol.

14. A method for assigning video-on-demand transmission channels to transmit on-demand video programming from a head-end communicating control data according to a first on-demand video application to plural clients communicating control data according to a second on-demand video application, the method performed by a proxy server computer receiving and sending control data, the method comprising:

receiving from a first client, a second application control data comprising on-demand video control;

assigning a first transmission channel to the first client;

sending to the head-end, a first application control data comprising instructions to transmit on-demand video on the first transmission channel;

sending to the first client, a second application control data comprising instructions to receive on-demand video on the first transmission channel;

receiving from a second client, a second application control data comprising on-demand video control;

assigning a second transmission channel to the second client;

sending to the head-end, a first application control data comprising instructions to transmit on-demand video on the second transmission channel;

and sending to the second client, a second application control data comprising instructions to receive on-demand video on the second transmission channel;

wherein the head-end was designed to communicate with clients communicating control data according to the first on-demand video application; and wherein the proxy server comprises a computer interposed between first and second clients and the head-end in a multi-tier configuration and wherein the proxy server translates between control data compatible with the first on-demand video application but not compatible with the second on-demand video application and control data compatible with the second on-demand video application but not compatible with the first on-demand video application, the translation facilitating integration of components communicating according to two or more non-compatible on-demand video applications.

15. In a video system with several different brands of video-on-demand applications, each such different brand operating according to a different communications protocol, the system comprising:

plural clients and plural servers, each client and each server communicating according to a single video on demand application, at least one client communicating according to a video on demand application incompatible with a video on demand application of at least one server; and a proxy server comprising a computer interposed between the at least one client and the at least one server, the proxy server translating between clients and servers communicating according to incompatible video on demand applications;

wherein the proxy server translates between clients and servers communicating according to incompatible applications, such that control data of a first application employed by a client and control data of a second application expected by the server are translated and the proxy server facilitates integration of otherwise non-compatible components into the video system.

16. The existing system of claim 15, wherein the several different brands include at least one of Seachange, Vivid and Netshow Theater.

* * * * *